(No Model.)
A. & A. T. HEYWOOD.
TOOL FOR MENDING PUNCTURES IN PNEUMATIC TIRES.
No. 570,664. Patented Nov. 3, 1896.
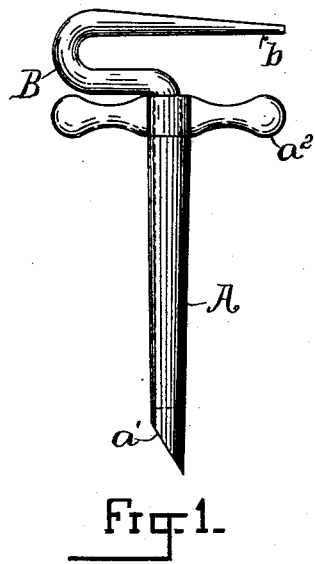
Fig. 1.
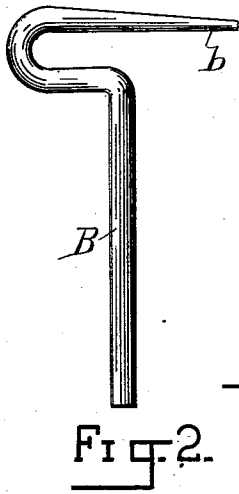
Fig. 2.
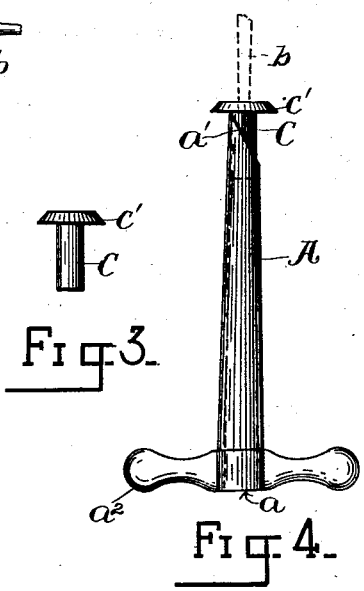
Fig. 3.
Fig. 4.
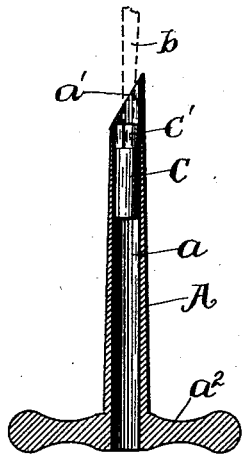
Fig. 5.
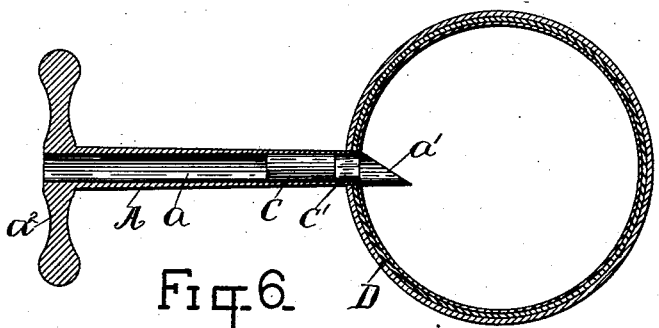
Fig. 6.
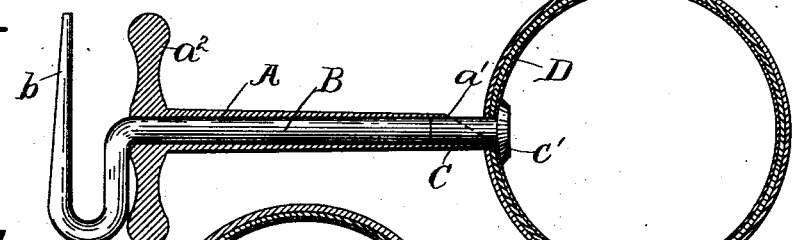
Fig. 7.
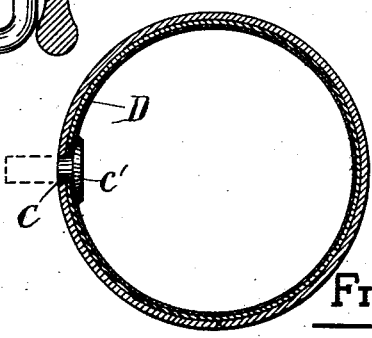
Fig. 8.
WITNESSES:
M. V. Weller
E. C. Dicey
INVENTORS:
Arthur Heywood
Arthur T. Heywood
by Fred W. Hersey
their Attorney
THE NORRIS PETERS CO., PHOTO-LITHO., WASHINGTON, D. C.

UNITED STATES PATENT OFFICE.

ARTHUR HEYWOOD AND ARTHUR T. HEYWOOD, OF CHICAGO, ILLINOIS.

TOOL FOR MENDING PUNCTURES IN PNEUMATIC TIRES.

SPECIFICATION forming part of Letters Patent No. 570,664, dated November 3, 1896.

Application filed March 16, 1895. Serial No. 542,064. (No model.)

*To all whom it may concern:*

Be it known that we, ARTHUR HEYWOOD and ARTHUR T. HEYWOOD, citizens of the United States, residing at Chicago, in the county of Cook and State of Illinois, have invented a certain new and useful Repair-Tool for Pneumatic Tires, &c., of which the following is a specification.

The object of our invention is to provide a means for the ready and perfect repair of punctures in a pneumatic tire.

It is well known that one of the most serious inconveniences incident to the use of pneumatic tires, whether of the single or double tube type, is that the tires, being made necessarily of rubber held under the expansion of internal air-pressure, are liable to be very easily punctured, and efforts to overcome this objection by changing the characteristics of the tire serve only to deteriorate the product. It is generally believed at the present time that the readiness to puncture must be accepted as an unavoidable condition, as any attempt to overcome this characteristic is bound to result in a decrease in the efficiency of the tire by stiffening it, hardening it, or otherwise interfering with the full resilience of the contained air. The condition being thus presented that the puncture is unavoidable, attention has been directed to devising means for the ready repair of punctures. In the case of the double-tube tire the problem is easy of solution, as it is merely necessary to separate the inner and outer tube, patch the former, and rewrap the latter. In the case of the single-tube tire this is out of the question. It was suggested by one of the first manufacturers of single-tube tires that a repair could be effectively made by introducing into the puncture a rubber rivet, the head of which should be within the tire, while the shank or thread should be held in the wall of the tire at the point of puncture, the method of introducing such a rivet or plug practiced and suggested by the inventor named being to enlarge the puncture to the form of a round hole, to force through this hole the head of the plug properly solutioned, a plug being selected the shank of which should in cross-section approximate the diameter of the hole. The effect of the internal air-pressure would be to tighten the contact between the plug-head and the inner wall of the tire.

Several devices adapted to repair tires by the method here disclosed and generally known as the "Boothroyd" method have been suggested; and it has also been suggested that the repair may be effected without first cutting a hole through the wall of the tire, and a repair-tool for this purpose has been patented. Devices are well known which have been contrived for the purpose of supporting and introducing the Boothroyd plug through the wall of the tire at the point of puncture without first enlarging the hole, and devices have been contrived by which the hole may be enlarged against the resistance of its elastic walls without cutting away any of the rubber. All the devices, however, have proved objectionable in one way or another. In case of a small puncture it is considered objectionable to be obliged to increase the size of the hole in order that it may be repaired. The effort to introduce a plug through a small puncture, the point of the plug-head serving as a means for expanding the opening, is full of difficulties, and the repairing is by no means easily effected in this way.

The tools, so far as they have yet been produced prior to our invention, which are contrived to expand the hole during the introduction of the plug, are complicated, expensive, and not always perfect in operation, though abundantly serviceable for the purpose at the time they were first introduced.

The object of our invention is to provide a means for introducing a Boothroyd plug into a punctured pneumatic tire in such a manner that the point of the plug-head shall not be employed to expand the puncture, although the puncture shall be expanded for the admission of the plug-head, this expansion being effected by a rigid tool cheap and simple to produce and light and convenient to carry.

Our invention consists in a repair-tool comprising a tubular stem bevel-pointed at its lower end and open throughout, which tube may have a handle rigidly secured thereto, if desired, in combination with a plunger in the form of a rod shorter than the tube, which rod has by preference at its upper or handle end a hook point to permit the operation of repairing to be effected in the manner presently described. In general it may be stated that the beveled point of the tubular tool is introduced into the puncture and serves to expand the same against the resilience of the tire-walls, that the rivet-shaped plug is previously introduced into the tubular tool at its end and entirely contained within the tube, and that the plunger or follower which is thereupon introduced into the tube from the other end serves to expel the plug-head first into the interior of the tire, the shank of the plug remaining in position to be gripped by the walls of the tube when the repair-tool is withdrawn.

It will be at once observed that with the essential characteristics here shown changes in minor detail are permissible, as will be explained more fully farther on.

In the drawings, Figure 1 is a view in side elevation of a repair-tool involving our construction. Fig. 2 is a similar view of the plunger; Fig. 3, a similar view of the Boothroyd plug; Fig. 4, a view in elevation of the bevel-pointed tube, illustrating diagrammatically the first step in the operation of introducing the plug into the tool; Fig. 5, a vertical sectional view of the repair-tool, illustrating diagrammatically the second step in the operation of introducing the plug into the tool; Fig. 6, a view showing a tire in cross-section and the repair-tool in longitudinal section and showing the relation of the tire and repair-tool in the first step of effecting a repair; Fig. 7, a view similar to that of Fig. 6, showing the plunger in position and the repair-tool partly withdrawn, whereby the plug is caused to be expelled into the hole in the tire-tube; and Fig. 8, a cross-section of a pneumatic tire, showing the repair effected.

A represents a tube, which, if preferred, may be made tapering from end to end on the outside, although this is not necessary, and it is generally preferred that in any event the bore shall be uniform throughout. The tube A is cut to a beveled point at its lower end, as indicated at $a'$, and at its upper end may be provided with a handle $a^2$.

B represents a plunger or follower, the function of which is to force the plug C out of the tube A and into the tire D. The follower B is shorter than the tube A, and it is preferred to give to its outer or free end the pointed hook shape indicated at $b$. The plug C has a handle $c'$.

The operation is as follows: The point of puncture in the tire being found, a plug C, having a shank of approximately the right diameter, is introduced into the end $a'$ of the tube A in the manner illustrated in Figs. 4 and 5; that is to say, the plug, properly smeared with solution, is placed shank first into the end of the tube A and then pressed into the tube either by pressing upon the middle of the head portion with the hook-point $b$ of the plunger B or with any other device serviceable for the purpose, until the rivet or plug is entirely contained within the bore of the tube, as indicated in Fig. 5. The point of the tube A is then introduced into the puncture, and by pushing in the tube the puncture is expanded, as indicated in Fig. 6. The plunger B is then introduced into the bore $a$ of the tool, and being pushed in as far as it will go serves to force the plug outward and into the bore of the tire-tube. Enough of the shank of the plug remains in the tube A so that when the tool is withdrawn the shank projects out from the tire-tube. The operator then draws upon this shank, held in the fingers, until perfect contact between the inside of the head of the plug and the inner wall of the tire is effected, whereupon the projecting part of the shank is cut off, as indicated in Fig. 8.

The device here described is found to possess all the attributes needed for effecting the perfect repair of a tire with a plug of the nature described. In case the puncture is very small a plug with a thin shank may be employed, and for very large punctures larger tools may be employed. For all ordinary purposes, and for the repair of the punctures most commonly met with, one tool, adapted to apply plugs of varying sizes, is entirely sufficient.

The device is cheap to make, easy to carry, and ornamental in appearance.

The arrangement of the plunger by which it affords at its upper end at the same time a handle for operating and a means for forcing the plug into the tool possesses many advantages, but it is quite apparent that either or both of these advantages may be had without the other by simply changing the form of the handle. We do not, therefore, limit ourselves to this particular construction.

What we claim as new, and desire to secure by Letters Patent, is—

1. A repair-tool for pneumatic tires, comprising a rigid tube, bevel-pointed at one end and adapted to receive a headed plug, and a plunger for expelling the plug from the tube, substantially as described.

2. A repair-tool comprising a bevel-pointed tube open from end to end and adapted to receive at the beveled end a headed repairing-plug, in combination with a plunger operating to expel the plug into the tire, whereby the puncture may be first expanded and the plug then introduced into the puncture, as set forth.

3. A repair-tool for pneumatic tires comprising in combination a bevel-pointed tube open from end to end and adapted to receive at the beveled end a headed plug, and a plunger shorter in length than the tube and having at its outer end a handle, whereby the puncture may be expanded by introducing the bevel-pointed tube containing the repair-plug, and the plug may then be expelled from the tube and into the tire, and whereby on the withdrawal of the tube from the tire the plug will be retained in the puncture, substantially as described.

4. A repair-tool for pneumatic tires, comprising in combination a bevel-pointed tube open from end to end and adapted to receive at its beveled end a headed repair-plug, and a plunger comprising the straight bore B and the hook-pointed handle portion $b$, whereby the plug may be introduced into the beveled end of the tube and forced into the same by pressure exerted through the hook-pointed end of the plunger, the puncture may be expanded by introducing the beveled point of the tube therein and the plug expelled out of the tube and into the tire through the medium of the plunger B, substantially as and for the purpose set forth.

ARTHUR HEYWOOD.
ARTHUR T. HEYWOOD.

Witnesses:
J. DIAMOND,
H. MEYERING.